UNITED STATES PATENT OFFICE 2,659,715

ALPHA-ACYLAMINOMETHYL ACRYLONITRILES AND POLYMERS THEREOF

Harry W. Coover, Jr. and Joseph B. Dickey, Kingsport, Tenn., assignors to Eastman Kodak Company, Rochester, N. Y., a corporation of New Jersey No Drawing. Application March 29, 1951, Serial No. 218,266

8 Claims. (Cl. 260—79.3)

This invention relates to alpha-acylaminomethyl acrylonitriles, to polymers thereof, and to a process for their preparation.

The new compounds of the invention are represented by the following general structural formula:

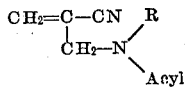

wherein R represents an atom of hydrogen, an alkyl group containing from 1 to 4 carbon atoms (e. g., methyl, ethyl, propyl, butyl, etc. groups) an aryl group (e. g., phenol or tolyl) or an acyl group and wherein Acyl represents the group —$COR_1$, the group

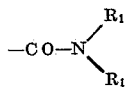

and the group —$SO_2R_1$ wherein $R_1$ represents an alkyl group containing from 1 to 4 carbon atoms and a phenyl group. The new compounds of the invention above described are valuable intermediates for the preparation of other useful compounds, especially as they are readily homo and copolymerizable to resinous products which are characterized by improved solubility in volatile solvents such as acetone, acetic acid, acetonitrile, etc., when compared to corresponding polymers of acrylonitrile. This fact, coupled with improved dyeing properties of the fibers spun from the homo and copolymers accentuates the potential commercial value of this new group of monomers of the invention.

It is, accordingly, an object of the invention to provide new derivatives of methacrylontrile. Another object is to provide resinous polymers of the same. Another object is to provide a process for preparing the new compounds. Other objects will become apparent, hereinafter.

In accordance with our invention, we prepare the compounds which are represented by the following general structural formula:

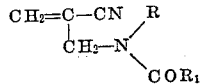

wherein R has the previously defined meaning and $R_1$ represents an alkyl group containing from 1 to 4 carbon atoms and a phenyl group, by reacting α-chloro or α-bromo methylacrylonitrile with an acylamide or diacylamide (e. g., acetamide, N-methyl acetamide, N-ethyl acetamide, N-butyl acetamide, N-phenylacetamide, N-p-tolyl-acetamide, diacetamide, propionamide, N-methyl propionamide, dipropionamide, butyramide, dibutyramide, propionyl butyramide etc.,) in the presence of an alkali-metal derivative (sodium or potassium) of the acylamide. Advantageously, the reaction is carried out in an inert diluent such as ether, 1,4-dioxane, etc. Preferably the salt of the acylamide is dissolved in the diluent and the α-chloro or α-bromomethyl acrylonitrile is added drop-wise, with stirring at low temperature, to the mixture, the acylamino methyl acrylonitrile product being then isolated by filtration of the mixture to remove chloride or bromide salt followed by fractional distillation of the filtered mixture. The amount of the acylamide employed can vary from 1 to 10 mol to each mole of α-chloro or α-bromomethyl acrylonitrile, but preferably it is employed in substantial excess. The amount of alkali-metal present is not critical but ordinarily it is used in just sufficient amount to react with all of the chloride or bromide liberated in the reaction. The temperature of the reaction can be varied widely from about 0° C. to the boiling point of the mixture, but preferably the reaction is completed after the addition of the α-chloro or α-bromomethyl acrylonitrile by slowly warming on a steam bath (up to 90°–100° C.).

To obtain the compounds of the invention which are represented by the general structural formula:

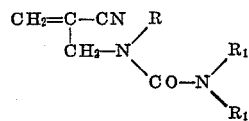

wherein R and $R_1$ have the previous definition, alpha-aminomethyl acrylonitrile is reacted with an isocyanate. Advantageously, the reaction can be carried out in an inert diluent such as water, ether, etc. The reaction is promoted by the presence of an acid such as hydrochloric acid. Suitable isocyanates include sodium or potassium isocyanate, methylisocyanate, ethylisocyanate, butylisocyanate, phenylisocyanate, p-tolyl isocyanate, etc., and corresponding alkali-metal derivatives. However, any organic or inorganic oxygen or sulfur isocyanate can be employed. Generally, the reaction is started at about 0° C. and when the reactants are completely added together the temperature is allowed to rise to room temperature, although temperatures up to 50° C. and even higher, can be employed to complete the reaction. The product can be isolated from the reaction mixture by the usual methods for isolation of product such as distillation and crystallization.

To obtain the compounds of the invention which are represented by the general structural formula:

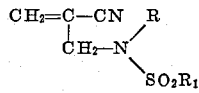

wherein R and R₁ are as previously defined, a sulfonamide (e. g., methane sulfonamide, ethanesulfonamide, butane sulfonamide, benzenesulfonamide, toluenesulfonamide, dimethanesulfonamide, etc.) is reacted with α-chloro or α-bromomethyl acrylonitrile, preferably in an inert diluent, for example, ethylene glycol dimethyl ether, in the presence of an alkali-metal (sodium or potassium). The proportions of reactants, temperature of reaction and the separation of the alpha-sulfonamidomethyl acrylonitrile product follows, in general, the procedure described above for preparing the carboxylic amides.

The polymerization of the new compounds of the invention alone or conjointly with one or more other unsaturated organic compounds is accelerated by heat, by actinic light and by polymerization catalysts which are known to promote the polymerization of vinyl and other unsaturated organic compounds such as peroxides, e. g., benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali-metal perborates, the water-soluble salts of percarbonic acid, the water-soluble salts of perphosphoric acid, etc. The organic peroxides are especially suitable. Mixtures of catalysts can be employed. An activating agent such as sodium bisulfite can be used, if desired, in conjunction with the polymerization catalysts.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially advantageous. The monomer or mixture of monomers can be advantageously emulsified in the water using emulsifying agents such as salts of higher fatty acids (e. g., sodium or potassium stearate, palmitate, etc.), ordinary soaps, salts of higher fatty alcohol sulfates (e. g., sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.) and higher molecular weight quaternary ammonium salts (e. g., dimethylbenzylphenyl ammonium chloride, etc.). For bead or granular polymerization relatively poor dispersing agents such as starch, methylated starch, gum arabic, polyvinyl alcohol, partly hydrolyzed polyvinyl acetate, gelatin, sodium glycolate and finely divided magnesium carbonate, etc., can be employed. Mixtures of dispersing agents can be used. In the polymerizations wherein the monomers are dispersed in nonsolvents, the dispersions can be facilitated by stirring, shaking or tumbling the polymerization mixtures.

The new monomers of the invention readily copolymerize with one or more other polymerizable unsaturated compounds containing the basic vinyl group $CH_2=CH-$ to give high molecular weight resinous polymers, for example, any of the new compounds with vinyl esters of carboxylic acids (e. g., vinyl acetate, vinyl butyrate, vinyl stearate, vinyl trifluoroacetate, vinyl benzoate, etc) vinylalkyl ketones (e. g., methyl vinyl ketone, ethyl vinyl ketone, trifluoromethyl vinyl ketone, etc.), vinyl alkyl ethers (e. g., methyl vinyl ether, butyl vinyl ether, etc.), vinyl sulfonamides (e. g., vinyl sulfonamide, N-methyl vinyl sulfonamide, etc.), vinyl halides (e. g., vinyl chloride, vinyl bromide, and vinyl fluoride), vinyl alkyl sulfones (e. g., vinyl methyl sulfone, vinyl ethyl sulfone, etc.), vinyl urethanes (e. g., vinyl methyl urethane, vinyl ethyl urethane, etc.), cyclic vinyl imides (e. g., vinyl succinimide, vinyl phthalimide, etc.), acrylic acid and its anhydride, amide, N-alkyl amide, nitrile, and the methyl, ethyl, butyl, benzyl and phenyl esters, etc.). Other unsaturated compounds which can be copolymerized with our new monomers include methacrylic acid and its anhydride, amide, N-alkyl amides, nitrile, and the methyl, ethyl, butyl, benzyl and phenyl esters, vinylidene dichloride, vinylidene chloride-fluoride, alkyl esters of maleic and fumaric acids such as methyl maleate, methyl fumarate, fumaronitrile, cis- and trans-β-cyano and carboxamido-methyl acrylate, and the like. The polymers and copolymers of the invention are soluble in one or more volatile solvents such as acetone, methyl ethyl ketone, acetonitrile, dimethyl formamide, dimethylacetamide, etc.

The copolymers of the invention can contain variable amounts of each comonomer and are obtained with starting polymerization mixtures containing from 5% to 95% by weight of the new unsaturates and from 95% to 5% by weight of the above mentioned other unsaturated organic compounds. The copolymers have been found to contain substantially the same proportion of substituents as employed in the polymerization mixtures. The temperature of the polymerizations can be varied widely. Where a polymerization activating agent is employed, the polymerization will take place at a temperature as low as 0° C. However, the preferred temperature range for the polymerizations is from 25° C. to 130° C. Where the polymerization is carried out in an inert solvent or in suspension in a nonsolvent, the monomers advantageously constitute from 5% to 50% by weight of the mixture.

The following examples will serve to illustrate further our new unsaturates, polymers thereof, and the manner of preparing the same.

*Example 1.—Alpha-acetaminomethyl acrylonitrile*

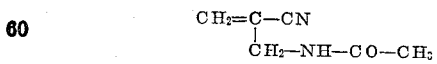

50 g. of acetamide were dissolved in 200 cc. of dry peroxide-free 1,4-dioxane in a 1-liter flask provided with a reflux condenser, a dropping funnel and a gas inlet tube. Nitrogen was passed through the flask to remove oxygen, then 2.3 g. of sodium were added and the reaction mixture was warmed to complete the formation of the intermediate N-sodium acetamide. Then 14.6 g. of alpha-bromomethyl acrylonitrile were added dropwise, with stirring, at 0° C. The reaction mixture was then warmed to complete the reaction and the sodium bromide which formed was filtered off. The filtrate was fractionally distilled under reduced pressure to give a colorless compound, alpha-acetaminomethyl acrylonitrile, B. P. 120°–123° C./0.5 mm. pressure.

*Example 2.—Alpha-N-methyl-acetaminomethyl acrylonitrile*

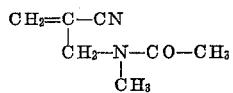

60 g. of N-methylacetamide were treated with 2.3 g. of sodium and the product was then reacted with alpha-chloromethyl acrylonitrile as in Example 1. The reaction mixture was filtered and the filtrate fractionally distilled to give the product, alpha-N-methyl-acetaminomethyl acrylonitrile, a colorless liquid, B. P. 103°–106° C./0.5 mm. pressure.

*Example 3.—Alpha-methane sulfonamidomethyl acrylonitrile*

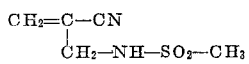

25 g. of methane sulfonamide were dissolved in 300 cc. of ethylene glycol dimethyl ether and reacted with 2.3 g. of sodium as in Example 1. 14.6 g. of alpha-bromomethyl acrylonitrile were then added dropwise at 0° C., to the mixture. After warming to complete the reaction, the mixture was filtered and the product, alpha-sulfonamidomethyl acrylonitrile, B. P. 121°–123° C. at less than 0.1 mm. pressure, was isolated by fractional distillation of the filtrate.

*Example 4.—Alpha-ureidomethyl acrylonitrile*

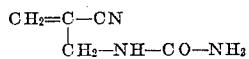

124 g. of alpha-acetaminomethyl acrylonitrile were stirred at room temperature, with the exclusion of air, in a mixture of 1000 cc. of water and 200 cc. of 35% hydrochloric acid, in the presence of hydroquinone. The mixture was gently warmed to complete the hydrolysis. It was then neutralized with sodium bicarbonate, extracted with ether, dried and distilled under reduced pressure to give the intermediate compound, alpha-aminomethyl acrylonitrile, a colorless liquid B. P. 49°–53° C./3 mm. pressure.

7.2 g. of alpha-aminomethyl acrylonitrile prepared as above described were dissolved in 200 cc. of water containing 15 cc. of 35% hydrochloric acid and 0.1 mol of sodium isocyanate added at 0° C. The reaction mixture was allowed to warm to room temperature, the excess of acid neutralized with sodium bicarbonate and water removed under reduced pressure. The product, alpha-ureidomethyl acrylonitrile, was a white solid which on analysis gave 33.2% by weight of nitrogen compared with calculated theory of 33.6% of nitrogen.

*Example 5.—Alpha-N-methylureidomethyl acrylonitrile*

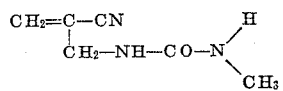

7.2 g. of alpha-aminomethyl acrylonitrile were dissolved in 50 cc. of ether and 0.1 mol of methylisocyanate added dropwise. The ether was then removed by distillation. The product, alpha-N-methylureidomethyl acrylonitrile, had a boiling point of 130°–133° C. at less than 0.1 mm. pressure. In similar manner any organic or inorganic oxygen or sulfur isocyanate can be reacted, for example, (CH₃)₃SiNCO, to give the corresponding N-substituted ureidomethyl acrylonitriles.

*Example 6.—Alpha-trifluoroacetaminomethyl acrylonitrile*

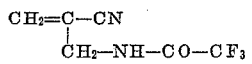

21 g. of trifluoroacetic anhydride were added dropwise with stirring to an oxygen-free solution of 7.2 g. of alpha-aminomethyl acrylonitrile in ether. When the reaction was complete, the ether was distilled off and the trifluoroacetic acid recovered by vacuum distillation. The product, alpha - trifluoroacetaminomethyl acrylonitrile, was isolated by fractional distillation of the residual mixture under reduced pressure. It had a boiling point of 101°–103° C./1 mm. pressure.

In similar manner, other acid anhydrides can be employed in place of the trifluoroacetic anhydride in the above example to give with acetic anhydride the product alpha-acetaminomethyl acrylonitrile, with butyric anhydride the product alpha-butyraminomethyl acrylonitrile, with benzoic anhydride the product alpha-benzolaminomethyl acrylonitrile, with methyoxyacetic anhydride the product alpha-methoxyacetaminomethyl acrylonitrile, and corresponding acyl-aminomethyl acrylonitriles with (CH₃-SO-CH₂-CO)₂O, (CH₃-CO-NH-CH₂-CO)₂O, etc.

*Example 7.—Alpha-ethanesulfonamidomethyl acrylonitrile*

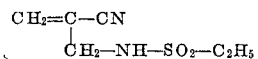

7.2 g. of alpha-aminomethyl acrylonitrile were dissolved in ether with 7 g. of sodium bicarbonate (suspended), and then 13 g. of ethanesulfonyl chloride were added dropwise with stirring in an atmosphere of nitrogen. When the reaction was complete, the mixture was filtered and distilled under reduced pressure. The product, alpha - ethanesulfonamidomethyl acrylonitrile, had a boiling point of 135°–137° C. at less than 0.1 mm. pressure.

In place of the ethane sulfonyl chloride, there can be substituted in the above example an equivalent amount of other acid chlorides such as p-toluenesulfonyl chloride, acetyl chloride,

[(CH₃)₂N]₂PO—Cl, (C₂H₅)₂N—CO—Cl etc.

*Example 8.—Poly alpha-acetaminomethyl acrylonitrile*

5 g. of alpha-acetaminomethyl acrylonitrile and 0.2 g. of benzoyl peroxide were placed in a sealed tube and heated at 100° C. for a period of 48 hours. A hard polymer soluble in dimethylformamide was obtained.

*Example 9.—Poly alpha-N-methyl-acetaminomethyl acrylonitrile*

5 g. of alpha-N-methyl-acetaminomethyl acrylonitrile were dissolved in 50 cc. of acetonitrile containing 0.2 g. of acetyl peroxide. Polymerization was completed by heating at 50° C. for 48 hours. A clear, viscous solution was obtained.

*Example 10.—Poly alpha-methanesulfonamidomethyl acrylonitrile*

5 g. of alpha-methane sulfonamidomethyl acrylonitrile were dissolved in 50 cc. of acetonitrile containing 0.2 g. of acetyl peroxide. Polymerization was completed by heating at 60° C. for 48 hours. A clear, viscous solution was obtained.

Example 11.—Poly alpha-ureidomethyl acrylonitrile 5 g. of alpha-ureidomethyl acrylonitrile were dissolved in 50 cc. of water containing 0.2 g. of ammonium persulfate. Polymerization was completed by heating at 70° C. for 48 hours. A clear, viscous solution was obtained.

Example 12.—Poly alpha-trifluoroacetaminomethyl acrylonitrile 5 g. of alpha-trifluoroacetaminomethyl acrylonitrile and 0.2 g. of benzoyl peroxide were placed in a sealed tube. Polymerization was completed by heating at 70° C. for 24 hours. A clear, viscous solution was obtained.

Example 13.—Copolymer of alpha-acetaminomethyl acrylonitrile and acrylonitrile 0.5 g. of alpha-acetaminomethyl acrylonitrile, 9.5 g. of acrylonitrile, 0.2 g. of ammonium persulfate, 0.2 g. of sodium bisulfite and 2 g. of potassium laurate were added to 100 cc. of distilled water. Polymerization began immediately and was complete within 8 hours. The polymer precipitated from solution and was isolated by filtration. The polymer was soluble in dimethylformamide, dimethylacetamide and similar solvents. It had a softening point above 190° C.

Example 14.—Copolymer of alpha - N - methylacetaminomethyl acrylonitrile and methyl methacrylate (a) 9.5 g. of alpha-N-methyl-acetaminomethyl acrylonitrile, 0.5 g. of methyl methacrylate and 0.2 g. of benzoyl peroxide were placed in a sealed tube. Polymerization was completed by heating at 70° C. for a period of 48 hours. A clear, hard polymer soluble in acetonitrile was obtained.

(b) 2 g. of alpha-N-methyl-acetaminomethyl acrylonitrile, 8 g. of methyl methacrylate and 0.3 g. of benzoyl peroxide were placed in a sealed tube and heated at 60° C. for 24 hours. A clear, soft, rubbery polymer soluble in acetone was obtained.

Example 15.—Copolymer of alpha-methanesulfonamidomethyl acrylonitrile and styrene 9 g. of alpha-methanesulfonamidomethyl acrylonitrile, 1 g. of styrene and 0.3 g. of acetyl peroxide were dissolved in 50 cc. of acetonitrile. Polymerization was completed by heating at 60° C. for a period of 48 hours. A clear, viscous solution was obtained.

Example 16.—Copolymer of alpha-trifluoroacetaminomethyl acrylonitrile and methacrylonitrile 5 g. of alpha-trifluoroacetaminomethyl acrylonitrile, 5 g. of methacrylonitrile and 0.3 g. of benzoyl peroxide were placed in a sealed tube. Polymerization was completed by heating at 70° C. for 48 hours. A clear, hard polymer soluble in acetone was obtained.

Example 17.—Copolymer of alpha-N-methylureidomethyl acrylonitrile and acrylonitrile 2 g. of alpha-N-methylureidomethyl acrylonitrile and 8 g. of acrylonitrile were added to 100 cc. of water containing 0.2 g. of potassium persulfate and 0.2 g. of sodium bisulfite. Polymerization began immediately and was complete within 12 hours. The precipitated polymer was isolated by filtration. The polymer was soluble in such solvents as dimethylacetamide and dimethylformamide.

By proceeding as set forth in the examples, other copolymers of similar properties can be prepared, for example, from monomeric mixtures containing 10%, 15%, 25%, 30%, 40%, 60%, 70% or 80% by weight of the total unsaturates of one or more of the new monomers of the invention, the remainder of the unsaturates in the mixtures being in each case selected from one or more of the other unsaturates mentioned as suitable for copolymerizing therewith. The copolymers prepared in accordance with the invention can be extruded from their solutions to form flexible filaments suited for spinning into yarns or coated from such solutions to form films, sheets, etc. Plasticizers, fillers, dyes, etc., can be incorporated into such compositions.

What we claim is:

1. Alpha-acetaminomethyl acrylonitrile.
2. Alpha-N-methyl-acetaminomethyl acrylonitrile.
3. Alpha-ethanesulfonamidomethyl acrylonitrile.
4. A copolymer of from 5 to 95% by weight of alpha-acetaminomethyl acrylonitrile and from 95 to 5% by weight of acrylonitrile.
5. A copolymer of from 5 to 95% by weight of alpha-N-methyl-acetaminomethyl acrylonitrile and from 95 to 5% by weight of methyl methacrylate.
6. A copolymer of from 5 to 95% by weight of alpha-methanesulfonamidomethyl acrylonitrile and from 95 to 5% by weight of styrene.
7. An α-acylaminomethyl acrylonitrile represented by the general structural formula:

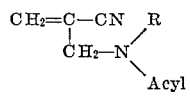

wherein Acyl represents a group selected from those consisting of a —CO—R$_1$ group, a

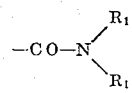

group and an —SO$_2$—R$_1$ group, wherein R$_1$ represents an alkyl group containing from 1 to 4 carbon atoms, and R represents a member selected from the group consisting of an atom of hydrogen, an alkyl group containing from 1 to 4 carbon atoms and an Acyl group, wherein Acyl has the meaning given above.

8. A polymer of an α-acylaminomethyl acrylonitrile represented by the general structural formula:

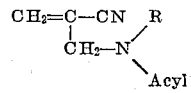

wherein Acyl represents a group selected from those consisting of a —CO—R$_1$ group, a

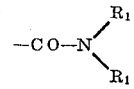

group and an —SO$_2$—R$_1$ group, wherein R$_1$ represents an alkyl group containing from 1 to 4 carbon atoms, and R represents a member selected from the group consisting of an atom of hydrogen, an alkyl group containing from 1 to 4 carbon atoms and an Acyl group, wherein Acyl has the meaning given above.

HARRY W. COOVER, JR.
JOSEPH B. DICKEY.

No references cited.